UNITED STATES PATENT OFFICE.

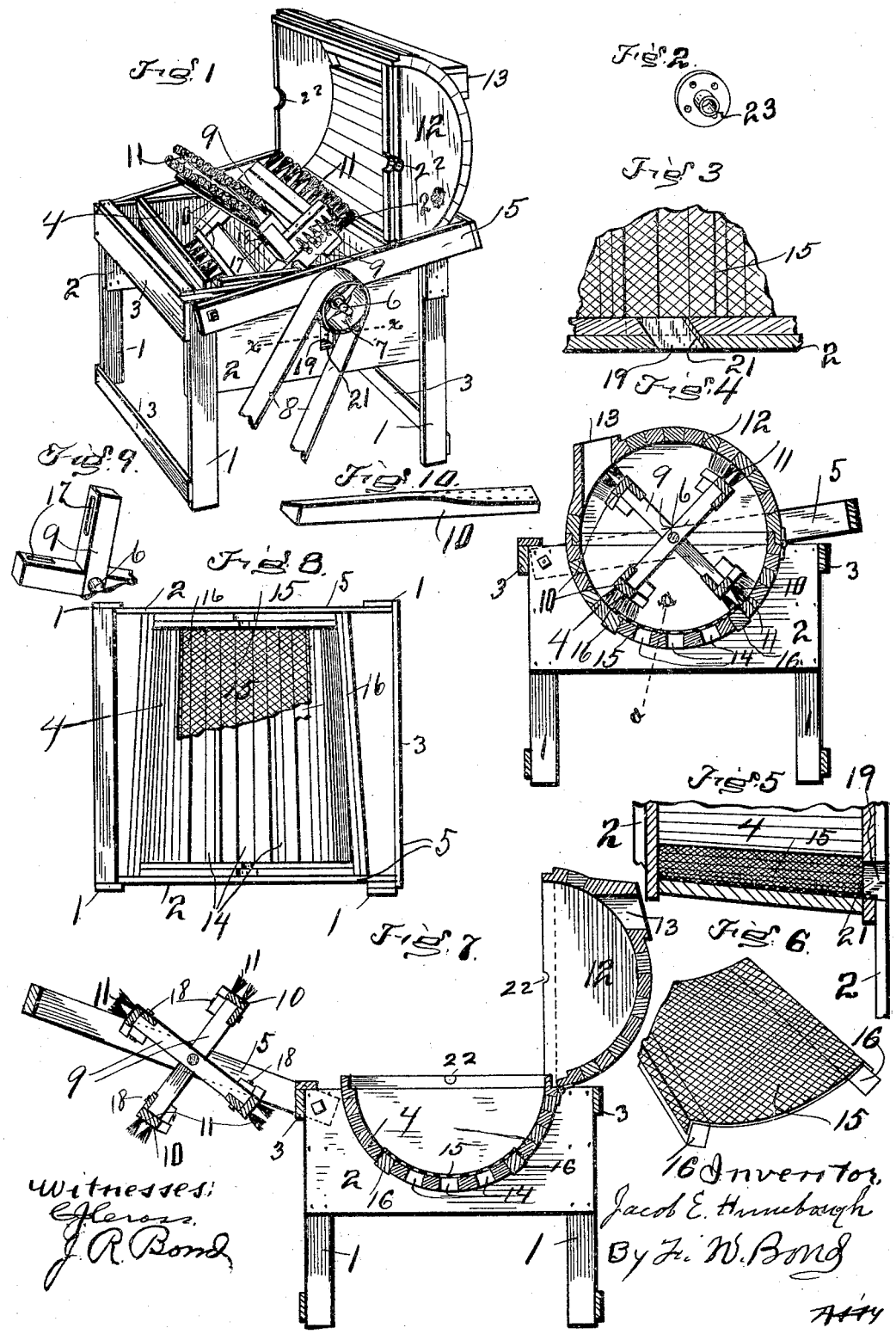

JACOB E. HIMEBAUGH, OF LAKE, OHIO.

APPLE-BUTTER MACHINE.

SPECIFICATION forming part of Letters Patent No. 682,196, dated September 10, 1901.

Application filed April 29, 1901. Serial No. 57,899. (No model.)

*To all whom it may concern:*

Be it known that I, JACOB E. HIMEBAUGH, a citizen of the United States, residing at Lake, in the county of Stark and State of Ohio, have invented certain new and useful Improvements in Apple-Butter Machines; and I do hereby declare that the following is a full, clear, and exact description of the same, reference being had to the annexed drawings, making a part of this specification, and to the figures of reference marked thereon, in which—

Figure 1 is a perspective view showing the cover turned back upon its hinges. Fig. 2 is a detached view of one of the shaft-bearings.
Fig. 3 is a detached view showing a portion of the bottom of the trough and the gauze properly located thereon. Fig. 4 is a transverse section showing the cover properly closed. Fig. 5 is a longitudinal section of the brush-head trough. Fig. 6 is a view showing a portion of the removable gauze and its retaining-strips. Fig. 7 is a transverse view showing the brush-head removed and the cover opened. Fig. 8 is a top view showing the brush-head and cover removed. Fig. 9 is a detached view of one of the brush-head spiders. Fig. 10 is a detached view of one of the brush-bars.

The present invention has relation to apple-butter machines; and it consists in the different parts and combination of parts hereinafter described, and particularly pointed out in the claims.

Similar numerals of reference indicate corresponding parts in all the figures of the drawings.

In the accompanying drawings, 1 represents the legs, which are attached in any convenient and well-known manner to the side members or bars 2 and the tie-bars 3, said parts being arranged substantially as shown, and, as shown, when said parts are properly connected they constitute a supporting-frame for the machine proper.

The semicircular trough or receptacle 4 is located substantially as shown in the drawings and is held in fixed relative position to the frame proper by attaching said trough to the side members or bars 2 or their equivalents, as it will be understood that said trough may be fixed in any other manner, as the only object in view is to securely hold said trough in a fixed position.

To the legs 1 of the frame proper or their equivalents is pivotally connected the rectangular frame 5, to which is easily journaled the shaft 6, which shaft is provided with an ordinary pulley-wheel 7, around which pulley-wheel a driving-belt, such as 8, passes, said driving-belt leading to any source of power. Upon the shaft 6 are securely attached the spiders 9, to the outer ends of which are adjustably connected the brush-heads 10, said brush-heads being provided with the brushes 11.

The object and purpose of providing adjustment for the brush-heads are to so arrange the brushes that they will come in proper operative contact with the gauze bottom 15 and at the same time against the inner periphery of the trough and cover 12 when said cover is brought into the position illustrated in Fig. 4.

Upon one side of the machine proper is located the opening 13, which opening is for the purpose hereinafter described.

The semicircular trough or receptacle 4 is provided with the openings or passages 14, said passages being located in the bottom or lower portion of the trough and for the purpose of allowing the disintegrated apples to pass through. Directly over the openings 14 and in the bottom or lower portion of the trough is located the gauze or strainer 15, to which gauze or strainer are securely attached the strips or bars 16, said strips or bars being located in suitable openings formed in the trough 4 and upon the outer sides of the openings 14.

It will be understood that by locating the strips 16 in openings formed in the trough 4, corresponding in size and shape with the openings into which the strips 16 are placed, the wire-gauze or strainer 15 will be held in proper relative position and at the same time may be easily removed for any purpose, such as cleaning or repairing.

For the purpose of adjusting the brush-heads 10 the spider-arms are provided with the slots 17, through which slots suitable clamping-bolts, such as 18, are placed. The trough 4 is formed tapering and is so formed for the purpose of providing an inclined bottom, by which arrangement the apples will have a tendency to move toward the lower portion of the trough or down the incline, the finer or grated portions passing through the wire-gauze and the larger portions being passed through the side opening 19, by which arrangement all the coarser particles are removed or separated from the finer portions of the apples.

It will be understood that the present machine is designed to operate upon apples that have been properly cooked by boiling and that the present invention is to take the place of the old way of reducing the apples to a pulp by stirring.

For the purpose of forcing the coarser particles through the opening 19 the end brushes, such as 20, are provided, which end brushes assist in forcing the coarser portion of the apples through aperture 19, and for the purpose of allowing the coarser portions to pass through the aperture 19 a metal plate, such as 21, is provided, which metal plate is located upon the bottom of the aperture and upon one side thereof.

For the purpose of forming brushes that will fit the tapered trough and the tapered cover the brush-heads 10 are beveled, as illustrated in Fig. 10, the bevel corresponding substantially with the taper of the trough and cover 12.

It will be understood that by hinging the frame in which the shaft 6 is journaled the trough, brush-center can be turned out of its as illustrated at 22 in Fig. 7.

For the purpose of providing suitable bearings for the shaft 6 the metal bearings 23 are provided, which metal bearings are securely connected to the side members of the pivoted frame 5.

It will be understood that the cover 12 is to be provided with the opening 13, through which opening the apples are to be fed, said opening being located upon the side of the cover substantially as illustrated in the drawings, and the brush-cylinder rotated in the direction to cause the brush-heads to move downward directly under the opening 13.

For the purpose of causing the coarser particles of the apples to pass through the aperture 19 said aperture is located at an angle to the trough 4, by which arrangement the action of the end brush 20 will have a better effect in forcing the coarser portions of the apples through said aperture.

I prefer to provide but two end brushes, such as 20. In the drawings I have illustrated but one; but the end brushes 20 should be so arranged that they will be located diametrically opposite each other, said end brushes being connected to one of the spiders of the brush-cylinder or to its equivalent.

Having fully described my invention, what I claim as new, and desire to secure by Letters Patent, is—

1. In an apple-butter machine of the class described, a frame having connected thereto a semicircular trough formed tapering longitudinally, a hinged frame having journaled thereto a shaft, a brush-cylinder mounted upon the shaft, a cover hinged to the stationary trough and the stationary trough provided with openings in its bottom or lower portion, and a removable gauze located over the openings, substantially as and for the purpose specified.

2. The combination of a frame having fixed thereto a semicircular trough, a hinged frame having journaled therein a shaft and said shaft having mounted thereon a brush-cylinder, openings formed in the fixed trough, and said trough formed tapering longitudinally, an aperture located at the lower end of the semicircular trough, end brushes fixed to the brush-cylinder, a gauze located over the openings in the fixed trough, and a hinged cover provided with an opening upon the side thereof, substantially as and for the purpose specified.

3. The combination of a frame having fixed thereto a semicircular trough or receptacle, a brush-cylinder journaled in a pivoted frame, the brush-heads of said cylinder tapered to correspond with the taper of the trough, said trough provided with openings in its bottom or lower portion, end brushes secured to the brush-cylinder, an opening or aperture located at the one end of the trough, and a removable gauze strainer located over the openings in the bottom of the trough, all arranged, substantially as and for the purpose specified.

In testimony that I claim the above I have hereunto subscribed my name in the presence of two witnesses.

JACOB E. HIMEBAUGH.

Witnesses:
F. W. BOND,
J. A. JEFFERS.